(12) United States Patent
Abad et al.

(10) Patent No.: US 10,369,842 B2
(45) Date of Patent: Aug. 6, 2019

(54) TIRE PROVIDED WITH A TREAD COMPRISING A THERMOPLASTIC ELASTOMER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Vincent Abad, Clermont-Ferrand (FR); Emmanuel Custodero, Clermont-Ferrand (FR); Christophe Chouvel, Clermont-Ferrand (FR); Marc Greiveldinger, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 180 days.

(21) Appl. No.: 15/114,499

(22) PCT Filed: Jan. 27, 2015

(86) PCT No.: PCT/EP2015/051588
§ 371 (c)(1),
(2) Date: Jul. 27, 2016

(87) PCT Pub. No.: WO2015/113966
PCT Pub. Date: Aug. 6, 2015

(65) Prior Publication Data
US 2016/0339743 A1 Nov. 24, 2016

(30) Foreign Application Priority Data
Jan. 28, 2014 (FR) ..................... 14 50667

(51) Int. Cl.
| | |
|---|---|
| *B60C 1/00* | (2006.01) |
| *C08L 53/02* | (2006.01) |
| *C08G 81/02* | (2006.01) |
| *C08L 9/06* | (2006.01) |

(52) U.S. Cl.
CPC .......... *B60C 1/0016* (2013.01); *C08G 81/022* (2013.01); *C08L 9/06* (2013.01); *C08L 53/02* (2013.01)

(58) Field of Classification Search
CPC ..... B60C 1/0016; C08G 81/022; C08L 53/02; C08L 9/06
See application file for complete search history.

(56) References Cited

U.S. PATENT DOCUMENTS

| | | | |
|---|---|---|---|
| 5,977,238 A | 11/1999 | Labauze | |
| 6,013,718 A | 1/2000 | Cabioch et al. | |
| 6,291,588 B1 * | 9/2001 | Nahmias | B60C 1/0016 525/132 |
| 6,503,973 B2 | 1/2003 | Robert et al. | |
| 6,815,473 B2 | 11/2004 | Robert et al. | |
| 7,230,050 B2 * | 6/2007 | Robertson | B60C 1/00 524/493 |
| 7,312,264 B2 | 12/2007 | Gandon-Pain | |
| 9,403,406 B2 | 8/2016 | Custodero et al. | |
| 9,849,727 B2 * | 12/2017 | Abad | B60C 1/0016 |
| 2001/0036991 A1 | 11/2001 | Robert et al. | |
| 2002/0183436 A1 | 12/2002 | Robert et al. | |
| 2006/0089445 A1 | 4/2006 | Gandon-Pain | |
| 2006/0089447 A1 | 4/2006 | Robertson et al. | ........... 524/493 |
| 2013/0165579 A1 * | 6/2013 | Mruk | C08F 222/38 524/521 |
| 2014/0076473 A1 * | 3/2014 | Abad | B60C 1/0016 152/209.1 |
| 2016/0347121 A1 | 12/2016 | Greiveldinger et al. | |
| 2017/0313130 A1 | 11/2017 | Chouvel et al. | |
| 2018/0178584 A1 | 6/2018 | Chouvel et al. | |
| 2018/0186184 A1 | 7/2018 | Chouvel et al. | |

FOREIGN PATENT DOCUMENTS

| | | | |
|---|---|---|---|
| EP | 1127909 A1 | 8/2001 | |
| FR | 2740778 A1 | 5/1997 | |
| FR | 2765882 A1 | 1/1999 | |
| JP | 2002212339 A * | 7/2002 | |
| JP | 2010-260915 A | 11/2010 | |
| JP | 2010-270314 A | 12/2010 | |
| JP | 2010-280853 A | 12/2010 | |
| WO | 01/92402 A1 | 12/2001 | |
| WO | 2004/096865 A1 | 11/2004 | |
| WO | 2012/152686 A1 | 11/2012 | |
| WO | WO-2012152686 A1 * | 11/2012 | ........... B60C 1/0016 |

OTHER PUBLICATIONS

Huang, Y., and D. R. Paul. "Effect of molecular weight and temperature on physical aging of thin glassy poly (2, 6-dimethyl-1, 4-phenylene oxide) films." Journal of Polymer Science Part B: Polymer Physics 45.12 (2007): 1390-1398.*
English-language machine translation of JP2002 212339, performed on Espacenet on Jun. 28, 2018. (Year: 2018).*
English language machine translation of JP2010270314, performed on Espacenet on Mar. 17, 2019.*
International Search Report dated Apr. 1, 2015, issued by EPO in connection with International Application No. PCT/EP2015/051588.
"Poly (Phenylene Oxides)", Ullmann's Encyclopedia of Industrial Chemistry, VCH, 5th edition, A21, 605-614 (1992).
(Continued)

*Primary Examiner* — Nicholas E Hill
(74) *Attorney, Agent, or Firm* — Venable LLP

(57) ABSTRACT

The present invention relates to a tire comprising a tread, a crown with a crown reinforcement, two sidewalls, two beads, a carcass reinforcement anchored to the two beads and extending from one sidewall to the other, in which the tread comprises at least one thermoplastic elastomer, said thermoplastic elastomer being a block copolymer comprising at least one elastomer block of optionally hydrogenated butadiene/styrene random copolymer type and at least one thermoplastic block of styrene type, and the total content of thermoplastic elastomer being within a range varying from 65 to 100 phr (parts by weight per hundred parts of elastomer).

24 Claims, No Drawings

(56) References Cited

OTHER PUBLICATIONS

S.C. Shit, et al., "Application of NMR Spectroscopy in Molecular Weight Determination of Polymers", European Polymer Journal, 22(12):1001-1008 (1986).
"Business of Xu chemical widened by three polymers", China Chemicals, p. 52 (2000), Issue 8 (partial translation).

* cited by examiner

TIRE PROVIDED WITH A TREAD COMPRISING A THERMOPLASTIC ELASTOMER

FIELD OF THE INVENTION

The present invention relates to tyres provided with a tread.

RELATED ART

In a conventional tyre, the tread predominantly comprises diene elastomers.

A constant aim of tyre manufacturers is to reduce the rolling resistance of tyres.

Within the context of the compromise between improving rolling resistance and improving wet grip of the tyres, the applicants previously described, in document WO 2012/152686, a tyre provided with a tread comprising at least one thermoplastic elastomer, said thermoplastic elastomer being a block copolymer comprising at least one elastomer block and at least one thermoplastic block, the total content of thermoplastic elastomer being within a range varying from 65 to 100 phr (parts by weight per hundred parts of elastomer). In particular, the applicants described a tread comprising, as thermoplastic elastomer, the styrene-isoprene-styrene (SIS) triblock copolymer, this tread enabling a reduction in rolling resistance compared to treads of conventional composition.

Now, the applicants have surprisingly found that a tyre provided with a tread comprising a specific thermoplastic elastomer made it possible to obtain a very great reduction in rolling resistance, even compared to the thermoplastic elastomer treads already described.

BRIEF DESCRIPTION OF EMBODIMENTS OF THE INVENTION

Therefore, the subject of the invention is a tyre comprising a tread, a crown with a crown reinforcement, two sidewalls, two beads, a carcass reinforcement anchored to the two beads and extending from one sidewall to the other, in which the tread comprises at least one thermoplastic elastomer, said thermoplastic elastomer being a block copolymer comprising at least one elastomer block of optionally hydrogenated butadiene/styrene random copolymer type and at least one thermoplastic block of styrene type, and the total content of thermoplastic elastomer being within a range varying from 65 to 100 phr (parts by weight per hundred parts of elastomer).

Preferentially, the invention relates to a tyre as defined above, in which the number-average molecular weight of the thermoplastic elastomer is between 30 000 and 500 000 g/mol.

Also preferentially, the invention relates to a tyre as defined above, in which the elastomer block(s) of the block copolymer are chosen from elastomers having a glass transition temperature of less than 25° C.

Still preferentially, the invention relates to a tyre as defined above, in which the SBR elastomer block(s) have a styrene content within a range extending from 10% to 60%. Preferably, the SBR elastomer block(s) have a content of 1,2-bonds for the butadiene part within a range extending from 4 mol % to 75 mol % and a content of 1,4-bonds within a range extending from 20 mol % to 96 mol %. Also preferably, the SBR elastomer block(s) are hydrogenated such that a proportion extending from 25 mol % to 100 mol % of the double bonds in the butadiene portion are hydrogenated, more preferentially a proportion extending from 50 mol % to 100 mol % and preferably from 80 mol % to 100 mol % of the double bonds in the butadiene portion are hydrogenated.

Preferentially, the invention relates to a tyre as defined above, in which the thermoplastic styrene block(s) of the block copolymer are chosen from polymers having a glass transition temperature of greater than 80° C. and, in the case of a semicrystalline thermoplastic block, a melting point of greater than 80° C. Preferably, the fraction of thermoplastic styrene block in the block copolymer is within a range extending from 5% to 70%. Preferably, the thermoplastic block(s) of the block copolymer are chosen from polystyrenes, preferentially from polystyrenes obtained from styrene monomers selected from the group consisting of unsubstituted styrene, substituted styrenes and mixtures thereof, and more preferentially from polystyrenes obtained from styrene monomers selected from the group consisting of unsubstituted styrene, methylstyrenes, para-tert-butylstyrene, chlorostyrenes, bromostyrenes, fluorostyrenes, para-hydroxystyrene and mixtures thereof. Very preferentially, the thermoplastic block(s) of the block copolymer are chosen from polystyrenes obtained from styrene monomers selected from the group consisting of unsubstituted styrene, o-methyl styrene, m-methyl styrene, p-methyl styrene, alpha-methyl styrene, alpha,2-dimethyl styrene, alpha,4-dimethyl styrene, diphenyl ethylene, para-tert-butyl styrene, o-chlorostyrene, m-chlorostyrene, p-chlorostyrene, 2,4-dichlorostyrene, 2,6-dichlorostyrene, 2,4,6-trichlorostyrene, o-bromostyrene, m-bromostyrene, p-bromostyrene, 2,4-dibromostyrene, 2,6-dibromostyrene, 2,4,6-tribromostyrene, o-fluorostyrene, m-fluorostyrene, p-fluorostyrene, 2,4-difluorostyrene, 2,6-difluorostyrene, 2,4,6-trifluorostyrene, para-hydroxystyrene and mixtures thereof. More preferentially, the thermoplastic block(s) of the block copolymer are obtained from unsubstituted polystyrene.

Preferentially, the invention relates to a tyre as defined above, in which the thermoplastic elastomer(s) are the only elastomers of the tread.

Also preferentially, the invention relates to a tyre as defined above, in which the tread additionally comprises a thermoplastic resin comprising optionally substituted polyphenylene ether units. Preferably, the thermoplastic resin based on optionally substituted polyphenylene ether units has a glass transition temperature ($T_g$), measured by DSC according to standard ASTM D3418, 1999, within a range extending from 0° C. to 215° C. Also preferably, the thermoplastic resin based on optionally substituted polyphenylene ether units is a compound comprising predominantly polyphenylene units of general formula (I):

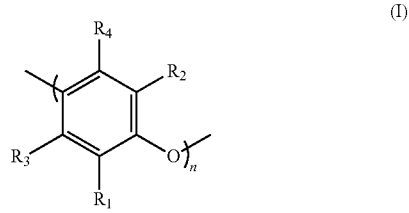

in which:
R$_1$, R$_2$, R$_3$ and R$_4$ represent, independently of one another, identical or different groups selected from hydrogen, hydroxyl, alkoxy, halogen, amino, alkylamino or dialkylamino groups or hydrocarbon-based groups comprising at least 2 carbon atoms, optionally interrupted by heteroatoms and optionally substituted; $R_1$ and $R_3$ on the one hand, and $R_2$ and $R_4$ on the other hand, possibly forming, together with the carbon atoms to which they are attached, one or more rings fused to the benzene ring of the compound of formula (I), n is an integer within a range extending from 3 to 300.

Preferentially, the invention relates to a tyre as defined above. in which $R_1$ and $R_2$ represent an alkyl group and in particular a methyl group, and $R_3$ and $R_4$ represent hydrogen atoms. Also preferably, the content of said thermoplastic resin based on optionally substituted polyphenylene ether units is within a range extending from 1 to 90 phr, preferably from 2 to 80 phr, more preferentially from 3 to 60 phr and better still from 5 to 60 phr.

The invention relates more particularly to the tyres intended to equip motorless vehicles, such as bicycles, or motor vehicles of the following types: passenger vehicles, SUVs (Sport Utility Vehicles), two-wheel vehicles (in particular motorcycles), aircraft, as well as industrial vehicles chosen from vans, heavy-duty vehicles—that is to say, underground trains, buses, heavy road transport vehicles (lorries, tractors, trailers) or off-road vehicles, such as agricultural vehicles or earthmoving equipment—, or other transportation or handling vehicles.

DETAILED DESCRIPTION OF THE INVENTION

In the present description, unless expressly indicated otherwise, all the percentages (%) shown are percentages by weight.

Furthermore, the term "phr" means, within the meaning of the present patent application, parts by weight per hundred parts of elastomer, thermoplastic and non-thermoplastic elastomers mixed together. Within the meaning of the present invention, thermoplastic elastomers (TPEs) are included among the elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

1. Composition of the Tread

The essential feature of the tyre according to the invention is that it comprises a tread, a crown with a crown reinforcement, two sidewalls, two beads, a carcass reinforcement anchored to the two beads and extending from one sidewall to the other, in which the tread comprises at least one thermoplastic elastomer, said thermoplastic elastomer being a block copolymer comprising at least one elastomer block of optionally hydrogenated butadiene/styrene random copolymer type and at least one thermoplastic block of styrene type, and the total content of thermoplastic elastomer being within a range varying from 65 to 100 phr (parts by weight per hundred parts of elastomer).

1.1 Specific Thermoplastic Elastomer (TPE) with SBR and PS Blocks

Generally, thermoplastic elastomers (abbreviated to "TPEs") have a structure intermediate between elastomers and thermoplastic polymers. These are block copolymers composed of rigid thermoplastic blocks connected via flexible elastomer blocks.

For the requirements of the invention, said specific thermoplastic elastomer is a block copolymer comprising at least one optionally hydrogenated butadiene/styrene random copolymer-type (SBR) elastomer block and at least one styrene copolymer-type (PS) thermoplastic block. In the following text, when reference is made to an SBR block, this is therefore an elastomeric block composed predominantly (that is to say to more than 50% by weight, preferably to more than 80% by weight) of a butadiene/styrene random copolymer, this copolymer possibly being or not being hydrogenated, and when reference is made to a styrene block, this is a block composed predominantly (that is to say to more than 50% by weight, preferably to more than 80% by weight) of a styrene polymer such as a polystyrene.

1.1.1. Structure of the TPE with SBR and PS Blocks

The number-average molecular weight (denoted $M_n$) of the TPE with SBR and PS blocks is preferentially between 30 000 and 500 000 g/mol, more preferentially between 40 000 and 400 000 g/mol. Below the minima indicated, there is a risk of the cohesion between the SBR elastomer chains of the TPE with SBR and PS blocks being affected, especially due to its possible dilution (in the presence of an extending oil); furthermore, there is a risk of an increase in the working temperature affecting the mechanical properties, especially the properties at break, with the consequence of a reduced "hot" performance. Furthermore, an excessively high weight $M_n$ can be detrimental for the processing. Thus, it has been observed that a value within a range from 50 000 to 300 000 g/mol, and better still from 60 000 to 150 000 g/mol, was particularly well suited, especially to use of the TPE with SBR and PS blocks in a tyre tread composition.

The number-average molecular weight ($M_n$) of the TPE elastomer with SBR and PS blocks is determined in a known way by size exclusion chromatography (SEC). For example, in the case of thermoplastic styrene elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6E), is used. The injected volume of the solution of the polymer sample is 100 μl. The detector is a Waters 2410 differential refractometer, and its associated software for making use of the chromatographic data is the Waters Millennium system. The calculated average molar masses are relative to a calibration curve produced with polystyrene standards. The conditions can be adjusted by those skilled in the art.

The value of the polydispersity index PI (reminder: $PI=M_w/M_n$, with $M_w$ the weight-average molecular weight and $M_n$ the number-average molecular weight) of the TPE with SBR and PS blocks is preferably less than 3, more preferentially less than 2 and even more preferentially less than 1.5.

In a known way, TPEs with SBR and PS blocks have two glass transition temperature peaks ($T_g$, measured according to ASTM D3418), the lowest temperature being relative to the SBR elastomer part of the TPE with SBR and PS blocks and the highest temperature being relative to the thermoplastic PS part of the TPE with SBR and PS blocks. Thus, the flexible SBR blocks of the TPEs with SBR and PS blocks are defined by a $T_g$ which is less than ambient temperature (25° C.), while the rigid PS blocks have a $T_g$ which is greater than 80° C.

In the present application, when reference is made to the glass transition temperature of the TPE with SBR and PS blocks, this is the $T_g$ relative to the SBR elastomer block. The TPE with SBR and PS blocks preferentially has a glass transition temperature ("$T_g$") which is preferentially less than or equal to 25° C., more preferentially less than or equal to 10° C. A $T_g$ value greater than these minima can reduce the performance of the tread when used at very low temperature; for such a use, the $T_g$ of the TPE with SBR and PS blocks is more preferentially still less than or equal to −10° C. Also preferentially, the $T_g$ of the TPE with SBR and PS blocks is greater than −100° C.

The TPEs with SBR and PS blocks can be copolymers with a small number of blocks (less than 5, typically 2 or 3), in which case these blocks preferably have high weights of greater than 15 000 g/mol. These TPEs with SBR and PS blocks can, for example, be diblock copolymers, comprising one thermoplastic block and one elastomer block. They are often also triblock elastomers with two rigid segments connected by one flexible segment. The rigid and flexible segments can be positioned linearly, or in a star or branched configuration. Typically, each of these segments or blocks often contains at least more than 5, generally more than 10, base units (for example, styrene units and butadiene/styrene units for a styrene/SBR/styrene block copolymer).

The TPEs with SBR and PS blocks can also comprise a large number of smaller blocks (more than 30, typically from 50 to 500), in which case these blocks preferably have relatively low weights, for example from 500 to 5000 g/mol; these TPEs with SBR and PS blocks will subsequently be referred to as multiblock TPEs with SBR and PS blocks and are an elastomer block/thermoplastic block series.

According to a first variant, the TPE with SBR and PS blocks is in a linear form. For example, the TPE with SBR and PS blocks is a diblock copolymer: PS block/SBR block. The TPE with SBR and PS blocks can also be a triblock copolymer: PS block/SBR block/PS block, that is to say one central elastomer block and two terminal thermoplastic blocks, at each of the two ends of the elastomer block. Equally, the multiblock TPE with SBR and PS blocks can be a linear series of SBR elastomer blocks/thermoplastic PS blocks.

According to another variant of the invention, the TPE with SBR and PS blocks of use for the requirements of the invention is in a star-branched form comprising at least three branches. For example, the TPE with SBR and PS blocks can then be composed of a star-branched SBR elastomer block comprising at least three branches and of a thermoplastic PS block located at the end of each of the branches of the SBR elastomer block. The number of branches of the central elastomer can vary, for example, from 3 to 12 and preferably from 3 to 6.

According to another variant of the invention, the TPE with SBR and PS blocks is provided in a branched or dendrimer form. The TPE with SBR and PS blocks can then be composed of a branched or dendrimer SBR elastomer block and of a thermoplastic PS block located at the end of the branches of the dendrimer elastomer block.

1.1.2. Nature of the Elastomer Blocks

For the requirements of the invention, the elastomer blocks of the TPE with SBR and PS blocks may be all the elastomers of butadiene/styrene random copolymer type (SBR) known to those skilled in the art.

The fraction of SBR elastomer block in the TPE with SBR and PS blocks is within a range extending from 30% to 95%, preferentially from 40% to 92% and more preferentially from 50% to 90%.

These SBR blocks preferably have a $T_g$ (glass transition temperature) measured by DSC according to standard ASTM D3418, 1999, of less than 25° C., preferentially less than 10° C., more preferentially less than 0° C. and very preferentially less than −10° C. Also preferentially, the $T_g$ of the SBR blocks is greater than −100° C. SBR blocks having a $T_g$ of between 20° C. and −70° C., and more particularly between 0° C. and −50° C., are especially suitable.

In a well known way, the SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated.

Preferentially, use is especially made of an SBR block having a styrene content for example within a range extending from 10% to 60% by weight, preferably from 20% to 50% by weight, and for the butadiene part, a content of 1,2-bonds within a range extending from 4% to 75% (mol %) and a content of 1,4-bonds within a range extending from 20% to 96% (mol %).

Depending on the degree of hydrogenation of the SBR block, the content of double bonds in the butadiene part of the SBR block can decrease as far as a content of 0 mol % for a completely hydrogenated SBR block. Preferably, in the TPEs with SBR and PS blocks of use for the requirements of the invention, the SBR elastomer block is hydrogenated such that a proportion ranging from 25 mol % to 100 mol % of the double bonds in the butadiene portion are hydrogenated. More preferentially, from 50 mol % to 100 mol % and very preferentially from 80 mol % to 100 mol % of the double bonds in the butadiene portion are hydrogenated.

Within the meaning of the present invention, the styrene part of the SBR blocks may be composed of monomers chosen from styrene monomers, and especially selected from the group consisting of unsubstituted styrene, substituted styrenes and mixtures thereof. Among the substituted styrenes, those selected from the group consisting of methyl styrenes (preferentially o-methyl styrene, m-methyl styrene and p-methyl styrene, alpha-methyl styrene, alpha,2-dimethyl styrene, alpha,4-dimethyl styrene and diphenylethylene), para-tert-butyl styrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrene), fluorostyrenes (preferentially o-fluorostyrene, m-fluorostyrene, p-fluorostyrene, 2,4-difluorostyrene, 2,6-difluorostyrene and 2,4,6-trifluorostyrenes), para-hydroxystyrene and mixtures thereof will preferentially be chosen.

According to a preferential embodiment of the invention, the elastomer blocks of the TPE with SBR and PS blocks have, in total, a number-average molecular weight ("$M_e$") ranging from 25 000 g/mol to 350 000 g/mol, preferably from 35 000 g/mol to 250 000 g/mol, so as to confer, on the TPE with SBR and PS blocks, good elastomeric properties and sufficient mechanical strength compatible with the use as tyre tread.

The elastomer block can also be composed of several elastomer blocks as defined above.

1.1.3. Nature of the Thermoplastic Blocks

Use will be made, for the definition of the thermoplastic blocks, of the characteristic of glass transition temperature ($T_g$) of the rigid thermoplastic block. This characteristic is well known to those skilled in the art. It makes it possible especially to choose the industrial processing (transformation) temperature. In the case of an amorphous polymer (or polymer block), the processing temperature is chosen to be substantially greater than the $T_g$. In the specific case of a semicrystalline polymer (or a polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference will be made to "$T_g$ (or M.p., if appropriate)", it will be necessary to consider that this is the temperature used to choose the processing temperature.

For the requirements of the invention, the TPE elastomers with SBR and PS blocks comprise one or more thermoplastic block(s) preferably having a $T_g$ (or M.p., if appropriate) of greater than or equal to 80° C. and composed of polymerized styrene (PS) monomers. Preferentially, this thermoplastic block has a $T_g$ (or M.p., if appropriate) within a range varying from 80° C. to 250° C. Preferably, the $T_g$ (or M.p., if appropriate) of this thermoplastic block is preferentially from 80° C. to 200° C., more preferentially from 80° C. to 180° C.

The fraction of PS thermoplastic block in the TPE with SBR and PS blocks is within a range extending from 5% to 70%, preferentially from 8% to 60% and more preferentially from 10% to 50%.

The thermoplastic blocks of the TPE with SBR blocks are polystyrene blocks. The preferential polystyrenes are obtained from styrene monomers selected from the group consisting of unsubstituted styrene, substituted styrenes and mixtures thereof. Among the substituted styrenes, those selected from the group consisting of methylstyrenes (preferentially o-methyl styrene, m-methyl styrene and p-methyl styrene, alpha-methyl styrene, alpha,2-dimethyl styrene, alpha,4-dimethyl styrene and di phenyl ethylene), para-tert-butyl styrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrene), fluorostyrenes (preferentially o-fluorostyrene, m-fluorostyrene, p-fluorostyrene, 2,4-difluorostyrene, 2,6-difluorostyrene and 2,4,6-trifluorostyrene), para-hydroxystyrene and mixtures thereof will preferentially be chosen.

Very preferentially, the thermoplastic blocks of the TPE with SBR blocks are blocks obtained from unsubstituted polystyrene.

According to a variant of the invention, the polystyrene block as defined above can be copolymerized with at least one other monomer, so as to form a thermoplastic block having a $T_g$ (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms.

According to the invention, the thermoplastic blocks of the TPE with SBR and PS blocks have, in total, a number-average molecular weight ("$M_n$") ranging from 5000 g/mol to 150 000 g/mol, so as to confer, on the TPE with SBR and PS blocks, good elastomeric properties and sufficient mechanical strength compatible with the use as tyre tread.

The thermoplastic block can also be composed of several thermoplastic blocks as defined above.

1.1.4. Examples of TPE with SBR and PS Blocks

By way of examples of commercially available TPE elastomers with SBR and PS blocks, mention may be made of SOE-type elastomers, sold by Asahi Kasei under the name SOE S1611, SOE L605, or else SOE L606.

1.1.5. Amount of TPE with SBR and PS Blocks

If optional other (non-thermoplastic) elastomers are used in the composition, the TPE elastomer(s) with SBR and PS blocks constitute the predominant fraction by weight; they then represent at least 65% by weight, preferably at least 70% by weight and more preferentially at least 75% by weight of all the elastomers present in the elastomer composition. Also preferentially, the TPE elastomer(s) with SBR and PS blocks represent at least 95% (in particular 100%) by weight of all the elastomers present in the elastomer composition.

Thus, the amount of TPE elastomer with SBR and PS blocks is within a range which varies from 65 to 100 phr, preferentially from 70 to 100 phr and in particular from 75 to 100 phr. Also preferentially, the composition contains from 95 to 100 phr of TPE elastomer with SBR and PS blocks. The TPE elastomer(s) with SBR and PS blocks are preferentially the only elastomer(s) of the tread.

1.2. Non-Thermoplastic Elastomer

The thermoplastic elastomer(s) described above are sufficient by themselves for the tread according to the invention to be usable.

The composition of the tread according to the invention can comprise at least one (that is to say, one or more) diene rubber as non-thermoplastic elastomer, it being possible for this diene rubber to be used alone or as a blend with at least one (that is to say, one or more) other non-thermoplastic rubber or elastomer.

The total content of optional non-thermoplastic elastomer is within a range varying from 0 to 35 phr, preferentially from 0 to 30 phr, more preferentially from 0 to 25 phr and more preferentially still from 0 to 5 phr. Thus, when the tread contains them, the non-thermoplastic elastomers represent at most 35 phr, preferentially at most 30 phr, more preferentially at most 25 phr and very preferentially at most 5 phr. Also very preferentially, the tread of the tyre according to the invention does not contain a non-thermoplastic elastomer.

The term "diene" elastomer or rubber should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated".

"Essentially unsaturated" is generally understood as meaning a diene elastomer resulting at least in part from conjugated diene monomers having a content of units of diene origin (conjugated dienes) which is greater than 15% (mol %). In the category of "essentially unsaturated" diene elastomers, the term "highly unsaturated" diene elastomer is understood as meaning in particular a diene elastomer having a content of units of diene origin (conjugated dienes) which is greater than 50%.

Thus it is that diene elastomers such as some butyl rubbers or copolymers of dienes and of alpha-olefins of EPDM type can be described as "essentially saturated" diene elastomers (low or very low content of units of diene origin, always less than 15%).

Given these definitions, diene elastomer, irrespective of the above category, capable of being used in the compositions in accordance with the invention is understood more particularly as meaning:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;

(d)—a copolymer of isobutene and isoprene (diene butyl rubber) and also the halogenated versions, in particular chlorinated or brominated versions, of this type of copolymer.

Any type of diene elastomer can be used in the invention. When the composition comprises a vulcanization system, use is preferably made of essentially unsaturated elastomers, in particular of the (a) and (b) types above, in the manufacture of the tread of the tyre according to the present invention.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. For coupling to carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). As other examples of functionalized elastomers, mention may also be made of elastomers (such as SBR, BR, NR or IR) of the epoxidized type.

1.3. PPE Resin

The thermoplastic elastomer(s) described above are sufficient by themselves for the tread according to the invention to be usable.

Preferentially, the composition according to the invention can also comprise a thermoplastic resin based on optionally substituted polyphenylene ether units (abbreviated to "PPE resin"). This type of compound is described for example in the encyclopaedia "Ullmann's Encyclopedia of Industrial Chemistry" published by VCH, vol. A 21, pages 605-614, 5th edition, 1992.

The PPE resin which is useful for the requirements of the invention preferably has a glass transition temperature ($T_g$), measured by DSC according to standard ASTM D3418, 1999, within a range extending from 0° C. to 215° C., preferably from 5° C. to 200° C. and more preferentially from 5° C. to 185° C. Below 0° C. the PPE resin does not enable a sufficient shift of the $T_g$ in the composition which comprises it and above 215° C. manufacturing problems, especially in terms of obtaining a homogeneous mixture, may be encountered.

Preferably, the PPE resin is a compound comprising predominantly polyphenylene units of general formula (I):

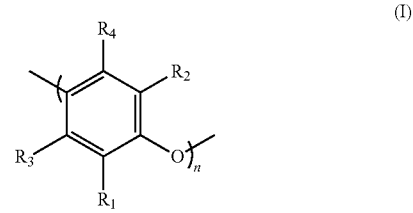

in which:

$R_1$, $R_2$, $R_3$ and $R_4$ represent, independently of one another, identical or different groups selected from hydrogen; hydroxyl, alkoxy, halogen, amino, alkylamino or dialkylamino groups; hydrocarbon-based groups comprising at least 2 carbon atoms, optionally interrupted by heteroatoms and optionally substituted; $R_1$ and $R_3$ on the one hand, and $R_2$ and $R_4$ on the other hand, possibly forming, together with the carbon atoms to which they are attached, one or more rings fused to the benzene ring of the compound of formula (I), n is an integer within a range extending from 3 to 300.

Preferentially, $R_1$, $R_2$, $R_3$ and $R_4$ represent, independently of one another, identical or different groups selected from:

hydrogen, hydroxyl, alkoxy, halogen, amino, alkylamino or dialkylamino groups, linear, branched or cyclic alkyl groups, comprising from 1 to 25 carbon atoms (preferably from 2 to 18), optionally interrupted by heteroatoms selected from nitrogen, oxygen and sulphur and optionally substituted by hydroxyl, alkoxy, amino, alkylamino, dialkylamino or halogen groups, aryl groups comprising from 6 to 18 carbon atoms (preferably from 6 to 12), optionally substituted by hydroxyl, alkoxy, amino, alkylamino, dialkylamino, alkyl or halogen groups.

More preferably, $R_1$, $R_2$, $R_3$ and $R_4$ represent, independently of one another, identical or different groups selected from:

hydrogen, hydroxyl groups, alkoxy groups comprising from 1 to 6 carbon atoms, halogen groups, amino groups, alkylamino groups comprising from 1 to 6 carbon atoms, or dialkylamino groups comprising from 2 to 12 carbon atoms, linear, branched or cyclic alkyl groups, comprising from 1 to 12 carbon atoms (preferably from 2 to 6), optionally interrupted by heteroatoms and optionally substituted by hydroxyl groups, alkoxy groups comprising from 1 to 6 carbon atoms, amino groups, alkylamino groups comprising from 1 to 6 carbon atoms, dialkylamino groups comprising from 2 to 12 carbon atoms, or halogen groups, aryl groups comprising from 6 to 18 carbon atoms (preferably from 6 to 12), optionally substituted by hydroxyl groups, alkoxy groups comprising from 1 to 6 atoms, amino groups, alkylamino groups comprising from 1 to 6 atoms, dialkylamino groups comprising from 2 to 12 carbon atoms, alkyl groups comprising from 1 to 12 carbon atoms, or halogen groups.

Even more preferentially, $R_1$ and $R_2$ represent an alkyl group and in particular a methyl group, and $R_3$ and $R_4$ represent hydrogen atoms. In this case, the PPE resin is a poly(2,6-dimethyl-1,4-phenylene ether).

Also preferentially, n is an integer within a range extending from 3 to 50, more preferably from 5 to 30 and preferably from 6 to 20.

Preferably, the PPE resin is a compound comprising more than 80% by weight, and more preferentially still more than 95% by weight of polyphenylene units of general formula (I).

By way of examples, mention may be made of poly(2,6-dimethyl-1,4-phenylene ether) and especially Noryl SA 120 from Sabic or Xyron S202A from Asahi Kasei.

In a known way, PPE resins have, for example and preferentially, number-average molecular weights ($M_n$) which are variable, most often from 15 000 to 30 000 g/mol; in the case of high weights such as these, $M_n$ is measured in a way known to those skilled in the art by SEC (also referred to as GPC, as in reference U.S. Pat. No. 4,588,806, column 8). For the requirements of the invention a PPE resin having a weight $M_n$ less than the weights usually encountered and especially less than 6000 g/mol, preferably less than 3500 g/mol and in particular an $M_n$ within a range extending from 700 to 2500 g/mol can also and preferentially also be used for the composition of the invention. The number-average molecular weight ($M_n$) of the PPEs with a weight less than 6000 g/mol is measured by NMR, since the conventional SEC measurement is not precise enough. This NMR measurement is carried out in a way known to those skilled in the art, either by assaying the chain end functions or by assaying the polymerization initiators, as explained for example in "Application of NMR spectroscopy in molecular weight determination of polymers" by Subhash C. Shit and Sukumar Maiti in "European Polymer Journal" vol. 22, no. 12, pages 1001 to 1008 (1986).

The value of the polydispersity index PI (reminder: $PI=M_w/M_n$, with $M_w$ the weight-average molecular weight and $M_n$ the number-average molecular weight) of the PPE resin is preferentially less than or equal to 5, more preferentially less than or equal to 3 and more preferentially still less than or equal to 2.

The content of PPE resin in the composition is preferentially within a range extending from 1 to 90 phr, more preferably from 2 to 80 phr, more preferentially still from 3 to 60 phr and very preferentially from 5 to 60 phr.

1.4. Nanometric or Reinforcing Filler

The thermoplastic elastomer(s) described above are sufficient by themselves for the tread according to the invention to be usable. Preferentially, the composition according to the invention can also comprise a reinforcing filler.

When a reinforcing filler is used, use may be made of any type of filler commonly used for the manufacture of tyres, for example an organic filler, such as carbon black, an inorganic filler, such as silica, or else a blend of these two types of filler, in particular a blend of carbon black and silica.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772), indeed even N990.

"Reinforcing inorganic filler" should be understood, in the present application, by definition, as meaning any inorganic or mineral filler, irrespective of its colour and its origin (natural or synthetic), also known as "white filler", "clear filler" or indeed even "non-black filler", in contrast to carbon black, capable of reinforcing by itself, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, reinforcing inorganic filler is also understood as meaning mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to those skilled in the art, especially any precipitated or fumed silica having a BET surface area and a CTAB specific surface area both of less than 450 $m^2/g$, preferably from 30 to 400 $m^2/g$. By way of highly dispersible precipitated silicas ("HDSs"), mention will be made, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas having a high specific surface area as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the composition (carbon black and/or reinforcing inorganic filler, such as silica) is within a range from 0% to 20%, which corresponds to a content of 0 to 50 phr for a plasticizer-free composition. Preferentially, the composition comprises less than 30 phr of reinforcing filler and more preferentially less than 10 phr. According to a preferential variant of the invention, the composition of the tread does not comprise reinforcing filler.

1.5. Various Additives

The thermoplastic elastomer(s) described above are sufficient by themselves for the tread according to the invention to be usable.

Nonetheless, according to one preferential embodiment of the invention, the elastomer composition described above can also comprise a plasticizing agent, such as an oil (or a plasticizing or extending oil) or a plasticizing resin, the role of which is to facilitate the processing of the tread, in particular its incorporation in the tyre, by lowering the modulus and increasing the tackifying power.

Use may be made of any oil, preferably having a weakly polar nature, capable of extending or plasticizing elastomers, especially thermoplastic elastomers. At ambient temperature (23° C.), these oils, which are more or less viscous, are liquids (that is to say, as a reminder, substances which have the ability to eventually assume the shape of their container), in contrast in particular to resins or rubbers, which are by nature solid. Use may also be made of any type of plasticizing resin known to those skilled in the art.

Those skilled in the art will know, in the light of the description and exemplary embodiments which follow, how to adjust the amount of plasticizer as a function of the TPE elastomer with SBR and PS blocks used (as indicated above) and of the specific conditions of use of the tyre provided with the tread, and especially as a function of the pneumatic article in which it is intended to be used.

When it is used, it is preferred that the content of extending oil be within a range varying from 0 to 80 phr, preferentially from 0 to 50 phr, more preferentially from 5 to 50 phr, depending on the $T_g$ and the modulus which are targeted for the tread.

The tread described above can furthermore comprise the various additives normally present in the treads known to those skilled in the art. The choice will be made, for example, of one or more additives chosen from protection agents, such as antioxidants or antiozonants, UV stabilizers, the various processing aids or other stabilizers, or else promoters capable of promoting the adhesion to the remainder of the structure of the pneumatic article. Preferentially, the tread does not contain all these additives at the same time and, more preferentially still, the tread does not contain any of these agents.

Equally and optionally, the composition of the tread of the invention can contain a crosslinking system known to those skilled in the art. Preferentially, the composition does not contain a crosslinking system. In the same way, the composition of the tread of the invention can contain one or more inert micrometric fillers, such as platy fillers, known to those skilled in the art. Preferably, the composition does not contain a micrometric filler.

2. Preparation

The TPE elastomers with SBR and PS blocks can be processed in the conventional way for TPEs, by extrusion or moulding, for example using a starting material available in the form of beads or granules.

The tread for the tyre according to the invention is prepared in the conventional way, for example by incorporation of the various components in a twin-screw extruder, so as to melt the matrix and incorporate all the ingredients, followed by use of a die which makes it possible to produce the profiled element. The tread pattern is then applied in the mould for curing the tyre.

If the elastomer block of the TPE with SBR and PS blocks is a completely hydrogenated SBR block, it may be necessary for the tyre to include an underlayer or an adhesion layer under the patterned portion of the tread, which will contain a TPE with SBR and PS blocks with unsaturated elastomer block to promote adhesion between said tread and the adjacent layer (for example the crown reinforcement or belt) within the finished tyre.

This tread may be mounted on a tyre in a conventional way, said tyre comprising, in addition to the tread according to the invention, a crown, two sidewalls and two beads, a carcass reinforcement anchored to the two beads, and a crown reinforcement. Optionally and as indicated above, the tyre according to the invention may also comprise an underlayer or an adhesion layer between the patterned portion of the tread and the crown reinforcement.

Exemplary Embodiments of the Invention

Tread compositions for a tyre according to the invention were prepared as indicated above.

Tyres according to the invention were subsequently prepared according to the usual methods, with the conventional constituents known to those skilled in the art: a crown, two sidewalls and two beads, a carcass reinforcement anchored to the two beads, a crown reinforcement and a tread, the tread being that described for the requirements of the present invention.

The properties of the tyres according to the invention can be evaluated by tests carried out on tyres or from tests on tread composition samples as indicated below.

Dynamic Properties (after Curing)

The dynamic properties G* and tan(δ)max are measured on a viscosity analyser (Metravib V A4000) according to Standard ASTM D 5992-96. The response of a sample of desired composition (cylindrical test specimen with a thickness of 2 mm and a cross section of 78 mm$^2$), subjected to a simple alternating sinusoidal shear stress, at a frequency of 10 Hz and at a temperature of 40° C. and according to Standard ASTM D 1349-99, is recorded. A peak-to-peak strain amplitude sweep is carried out from 0.1% to 50% (outward cycle) and then from 50% to 0.1% (return cycle). The results made use of are the complex dynamic shear modulus (G*) and the loss factor (tan δ). The maximum value of tan δ observed (tan(δ)$_{max}$) and the difference in complex modulus (ΔG*) between the values at 0.1% and at 50% strain (Payne effect) are shown for the return cycle. For greater readability, the results will be shown in terms of performance in base 100, the value 100 being assigned to the control. Thus, for the measurement of (tan δ), a result of greater than 100 will indicate better performance and thus a reduction in the value concerned, and conversely a result of less than 100 indicates poorer performance and thus an increase in the value concerned.

Measurements of E"

The method of measurement of E' is carried out using a DMA METRAVIB 450+ device equipped with PET10003000B compression plates. The test carried out is a dynamic compression test on a cylindrical sample having a diameter of 10 mm and a height of 15 mm.

The TPE formulation or the raw elastomer mixture chosen is first formed into sheets (e.g., under a press for the TPE and on an open mill for the elastomer mixture). Small discs with a diameter of 10 mm will subsequently be cut out using a hollow punch. These discs are stacked until a height of at least 15 mm is obtained.

These stacked discs are subsequently placed in a mould, the internal dimensions of which are a diameter of 10 mm and a height of 15 mm. The assembly is passed into a press in order to melt the non-crosslinkable mixture or to cure the crosslinkable mixture and to constitute a cylindrical sample with a diameter of 10 mm and a height of 15 mm.

Typically, this curing (for the crosslinkable mixture) or forming (for the non-crosslinkable mixture) heat treatment is at 170° C. under 16 bar for 17 min. After forming and, if appropriate, curing, the cylindrical sample obtained is rendered integral with the compression plates using an adhesive, Loctite 406. A drop of this adhesive is first deposited at the centre of the lower plate. The cylindrical sample is positioned on this drop and a second drop is deposited on top of the cylindrical sample. The crosspiece of the Metravib will subsequently be lowered in order to cause the upper plate to adhesively bond to the top of the sample, care being taken not to crush it (virtually zero force).

After drying the adhesive for a few minutes, a sinusoidal stress is applied to this cylindrical sample at a degree of static deformation of 10% and a degree of dynamic deformation of 0.1% at 1 Hz. The variation in the E" modulus as a function of the temperature is studied for a range varying from 40° C. to 200° C. at a rate of variation of 1° C./min.

Typically, a plot of the change in the E" modulus as a function of the temperature is then obtained. From this curve, it is possible to extract the temperature values corresponding to the maximum E". This maximum temperature is representative, for the thermoplastic-based compositions, of the glass transition of the composition, which shows the heat resistance thereof. For greater readability, the results will be shown in terms of performance in base 100, the value 100 being assigned to the control. A result of less than 100 will indicate a decrease in the performance concerned and, conversely, a result of greater than 100 will indicate an increase in the performance concerned.

Example

Three tyre tread compositions in accordance with the invention (A3, A4 and A5) were prepared as indicated above and compared to two controls: a control tyre tread composition of "green tyre" type with low rolling resistance (A1) and a tread composition as described in document WO 2012/152686 (A2). The compositions of these treads are presented in Table 1 below.

TABLE 1

| | Composition | | | | |
|---|---|---|---|---|---|
| | A-1 | A-2 | A-3 | A-4 | A-5 |
| SBR (1) | 40 | 0 | 0 | 0 | 0 |
| SBR (2) | 60 | 0 | 0 | 0 | 0 |
| TPE elastomer (3) | 0 | 100 | 0 | 0 | 0 |
| TPE elastomer (4) | 0 | 0 | 100 | 100 | 100 |
| Filler (5) | 90 | 0 | 0 | 0 | 0 |
| Coupling agent (6) | 7.5 | 0 | 0 | 0 | 0 |
| Carbon black (7) | 4 | 0 | 0 | 0 | 0 |
| Liquid plasticizer 1 (8) | 20 | 0 | 0 | 0 | 0 |
| Liquid plasticizer 2 (9) | 0 | 20 | 0 | 0 | 0 |
| Resin (10) | 20 | 0 | 0 | 0 | 0 |
| PPE Resin 1 (11) | | | 0 | 18 | 0 |
| PPE Resin 2 (12) | | | 0 | 0 | 18 |
| Antiozone wax | 1.5 | 0 | 0 | 0 | 0 |
| Antioxidant (13) | 2 | 0 | 0 | 0 | 0 |
| DPG (14) | 1.5 | 0 | 0 | 0 | 0 |
| ZnO (15) | 2.75 | 0 | 0 | 0 | 0 |
| Stearic acid (16) | 2 | 0 | 0 | 0 | 0 |

TABLE 1-continued

| | Composition | | | | |
|---|---|---|---|---|---|
| | A-1 | A-2 | A-3 | A-4 | A-5 |
| CBS (17) | 2.1 | 0 | 0 | 0 | 0 |
| Sulphur | 1.4 | 0 | 0 | 0 | 0 |

(1) Solution SSBR (contents expressed as dry SBR: 41% of styrene, 24% of 1,2-polybutadiene units and 51% of trans-1,4-polybutadiene units ($T_g$ = −25° C.));
(2) Solution SSBR (contents expressed as dry SBR: 29% of styrene, 5% of 1,2-polybutadiene units and 80% of trans-1,4-polybutadiene units ($T_g$ = −56° C.));
(3) SIS thermoplastic elastomer, Hybrar 5125, from Kuraray;
(4) SOE thermoplastic elastomer, SOE L606, from Asahi Kasei;
(5) Silica (Zeosil 1165MP, from Rhodia);
(6) TESTP coupling agent (Si69, from Degussa);
(7) Carbon black N234;
(8) TDAE oil, Vivatec 500, from Hansen & Rosenthal;
(9) Paraffinic oil, Extensoil 51 24T, from Repsol or Tudalen 1968 from Klaus Dahleke;
(10) $C_5/C_9$ Resin, Cray Valley Wingtack, from STS;
(11) PPE resin 1 Poly(2,6-dimethyl-1,4-phenylene ether), Noryl SA120, from Sabic, $M_n$ = 2350 g/mol;
(12) PPE resin 2 Poly(2,6-dimethyl-1,4-phenylene ether), Xyron S202 A, from Sabic, $M_n$ = 19 000 g/mol;
(13) N-(1,3-Dimethylbutyl)-N-phenyl-para-phenylenediamine (Santoflex 6-PPD from Flexsys);
(14) DPG = Diphenylguanidine (Perkacit DPG from Flexsys);
(15) Zinc oxide (industrial grade - Umicore);
(16) Stearin (Pristerene from Uniqema);
(17) N-Cyclohexyl-2-benzothiazolesulphenamide (Santocure CBS from Flexsys).

There may be noted in these compositions the great saving in means, related to the use of TPE elastomers with SBR and PS blocks in the composition of the tread.

The performance properties of the compositions of the invention were subsequently evaluated in terms of their hysteresis and their heat resistance. The results are presented in Table 2.

TABLE 2

| | Composition | | | | |
|---|---|---|---|---|---|
| | A-1 | A-2 | A-3 | A-4 | A-5 |
| tan(δ)max at 40° C. (base 100) | 100 | 123 | 386 | 300 | 300 |
| Temperature of E' max | — | — | 116 | 132 | 147 |

The results presented in Table 2 demonstrate that the treads of composition A3, A4 and A5 according to the invention enable a noteworthy improvement in hysteresis performance, representative of the rolling resistance performance. Moreover, it is very surprising that, in light of the prior art, the TPE with SBR and PS blocks and a PPE resin are sufficient to obtain a tread, the hysteresis performance properties of which are improved to this extent, compared to a conventional diene tread but also compared to a TPE tread, as described in document WO 2012/152686.

Moreover, the results also show, for compositions A4 and A5 especially, a noteworthy improvement in heat resistance compared to composition A3.

The invention claimed is:

1. A tire comprising a tread, a crown with a crown reinforcement, two sidewalls, two beads, a carcass reinforcement anchored to the two beads and extending from one sidewall to the other, wherein the tread comprises at least one thermoplastic elastomer and optionally at least one non-thermoplastic elastomer, said thermoplastic elastomer being a block copolymer comprising at least one elastomer block of hydrogenated butadiene/styrene random copolymer type and at least one thermoplastic block of styrene type, and the total content of thermoplastic elastomer being within a range varying from 65 to 100 phr per total elastomer in the tread, wherein the at least one elastomer block is hydrogenated such that a proportion extending from 25 mol % to 100 mol % of the double bonds in the butadiene portion are hydrogenated.

2. The tire according to claim 1, wherein the at least one elastomer block is hydrogenated such that a proportion extending from 50 mol % to 100 mol % of the double bonds in the butadiene portion are hydrogenated.

3. The tire according to claim 2, wherein the at least one elastomer block is hydrogenated such that a proportion extending from 80 mol % to 100 mol % of the double bonds in the butadiene portion are hydrogenated.

4. The tire according to claim 1, wherein the number-average molecular weight of the thermoplastic elastomer is between 30,000 and 500,000 g/mol.

5. The tire according to claim 1, wherein the at least one elastomer block of the block copolymer is chosen from elastomers having a glass transition temperature of less than 25° C.

6. The tire according to claim 1, wherein the at least one elastomer block has a styrene content within a range extending from 10% to 60%.

7. The tire according to claim 1, wherein the at least one elastomer block has a content of 1,2-bonds for the butadiene part within a range extending from 4 mol % to 75 mol % and a content of 1,4-bonds within a range extending from 20 mol % to 96 mol %.

8. The tire according to claim 1, wherein the at least one thermoplastic block of the block copolymer is chosen from polymers having a glass transition temperature of greater than 80° C. and, in the case of a semicrystalline thermoplastic block, a melting point of greater than 80° C.

9. The tire according to claim 1, wherein the fraction of the at least one thermoplastic block in the block copolymer is within a range extending from 5% to 70%.

10. The tire according to claim 1, wherein the at least one thermoplastic block of the block copolymer is chosen from polystyrenes.

11. The tire according to claim 10, wherein the at least one thermoplastic block of the block copolymer is chosen from polystyrenes obtained from styrene monomers selected from the group consisting of unsubstituted styrene, substituted styrenes and mixtures thereof.

12. The tire according to claim 11, wherein the at least one thermoplastic block of the block copolymer is chosen from polystyrenes obtained from styrene monomers selected from the group consisting of unsubstituted styrene, methylstyrenes, para-tert-butylstyrene, chlorostyrenes, bromostyrenes, fluorostyrenes, para-hydroxystyrene and mixtures thereof.

13. The tire according to claim 12, wherein the at least one thermoplastic block of the block copolymer is chosen from polystyrenes obtained from styrene monomers selected from the group consisting of unsubstituted styrene, o-methylstyrene, m-methylstyrene, p-methyl styrene, alpha-methyl styrene, alpha,2-dimethyl styrene, alpha,4-dimethyl styrene, diphenylethylene, para-tert-butyl styrene, o-chlorostyrene, m-chlorostyrene, p-chlorostyrene, 2,4-dichlorostyrene, 2,6-dichlorostyrene, 2,4,6-trichlorostyrene, o-bromostyrene, m-bromostyrene, p-bromostyrene, 2,4-dibromostyrene, 2,6-dibromostyrene, 2,4,6-tribromostyrene, o-fluorostyrene, m-fluorostyrene, p-fluorostyrene, 2,4-difluorostyrene, 2,6-difluorostyrene, 2,4,6-trifluorostyrene, para-hydroxystyrene and mixtures thereof.

14. The tire according to claim 13, wherein the at least one thermoplastic block of the block copolymer is obtained from unsubstituted polystyrene.

15. The tire according to claim 1, wherein the at least one thermoplastic elastomer is the only elastomer of the tread.

16. The tire according to claim 1, wherein the tread additionally comprises a thermoplastic resin comprising optionally substituted polyphenylene ether units.

17. The tire according to claim 16, wherein the thermoplastic resin comprising optionally substituted polyphenylene ether units has a glass transition temperature $T_g$, measured by DSC according to Standard ASTM D3418, 1999, within a range extending from 0° C. to 215° C.

18. The tire according to claim 16, wherein the thermoplastic resin comprising optionally substituted polyphenylene ether units is a compound comprising predominantly polyphenylene units of general formula (I):

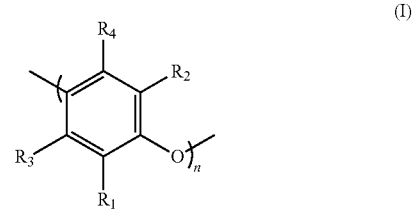

in which:
$R_1$, $R_2$, $R_3$ and $R_4$ represent, independently of one another, identical or different groups selected from hydrogen, hydroxyl, alkoxy, halogen, amino, alkylamino or dialkylamino groups or hydrocarbon-based groups comprising at least 2 carbon atoms, optionally interrupted by heteroatoms and optionally substituted; $R_1$ and $R_3$ on the one hand, and $R_2$ and $R_4$ on the other hand, possibly forming, together with the carbon atoms to which they are attached, one or more rings fused to the benzene ring of the compound of formula (I), and
n is an integer within a range extending from 3 to 300.

19. The tire according to claim 18, wherein $R_1$ and $R_2$ represent an alkyl group and $R_3$ and $R_4$ represent hydrogen atoms.

20. The tire according to claim 18, wherein $R_1$ and $R_2$ represent a methyl group.

21. The tire according to claim 16, wherein the content of said thermoplastic resin comprising optionally substituted polyphenylene ether units is within a range extending from 1 to 90 phr.

22. The tire according to claim 21, wherein the content of said thermoplastic resin based on optionally substituted polyphenylene ether units is within a range extending from 2 to 80 phr.

23. The tire according to claim 16, wherein the content of said thermoplastic resin comprising optionally substituted polyphenylene ether units is within a range extending from 3 to 60 phr.

24. The tire according to claim 23, wherein the content of said thermoplastic resin comprising optionally substituted polyphenylene ether units is within a range extending from 5 to 60 phr.

* * * * *